United States Patent [19]

Kobayashi

[11] 4,330,840

[45] May 18, 1982

[54] MULTI-FUNCTION ELECTRONIC DIGITAL WATCH

[75] Inventor: Isamu Kobayashi, Tokyo, Japan

[73] Assignee: Hitachi, Ltd., Tokyo, Japan

[21] Appl. No.: 105,926

[22] Filed: Dec. 21, 1979

[30] Foreign Application Priority Data

Jan. 17, 1979 [JP] Japan ..................................... 54-2972

[51] Int. Cl.³ ......................... G06F 7/48; G06F 15/02; G04B 19/30

[52] U.S. Cl. ......................................... 364/705; 368/10

[58] Field of Search ........................... 364/705; 368/10

[56] References Cited

U.S. PATENT DOCUMENTS

| | | | |
|---|---|---|---|
| 4,022,014 | 5/1977 | Lowdenslager | 368/10 X |
| 4,063,409 | 12/1977 | Bayliss | 58/23 R |
| 4,078,375 | 3/1978 | Kashio | 58/23 R |
| 4,093,992 | 6/1978 | Kawamura et al. | 368/10 X |
| 4,205,516 | 6/1980 | Terao | 364/705 X |

FOREIGN PATENT DOCUMENTS

| | | |
|---|---|---|
| 2548511 | 5/1976 | Fed. Rep. of Germany . |
| 2629950 | 1/1977 | Fed. Rep. of Germany . |
| 2753876 | 6/1978 | Fed. Rep. of Germany . |
| 2816820 | 11/1978 | Fed. Rep. of Germany . |
| 2906007 | 9/1979 | Fed. Rep. of Germany . |
| 2906033 | 8/1979 | Fed. Rep. of Germany . |
| 1549449 | 8/1979 | United Kingdom . |
| 2017355 | 10/1979 | United Kingdom . |
| 2027233 | 2/1980 | United Kingdom . |
| 2027234 | 2/1980 | United Kingdom . |

*Primary Examiner*—Jerry Smith

*Attorney, Agent, or Firm*—Craig and Antonelli

[57] ABSTRACT

A digital watch of the dynamic logic type having a time base circuit consists of a counter receiving as a clock signal a timing signal having a period shorter than that of a time base signal of the system, a decoder for decoding a content of the counter, and a latch circuit for latching the content of the counter. The time base signal of the system is produced from the decoder of the time base circuit, while an operation of correcting a measured time stored in a random access memory is executed on the basis for the content of the counter.

5 Claims, 6 Drawing Figures

FIG. 2(a)

| RŌM LOCATION | | INSTRUCTION |
|---|---|---|
| PAGE | ADDRESS | |
| 1 | 0 | LOAD 1,2 |
| 1 | 1 | BINARY ADD 1 |
| 1 | 2 | LESS THAN 10 |
| 1 | 3 | BRANCH 20 |
| 1 | 4 | TRANSFER 0 |
| 1 | 5 | LOAD 1,3 |
| 1 | 6 | BINARY ADD 1 |
| ⋮ | ⋮ | ⋮ |
| 1 | 20 | HALT |

FIG. 2(b)

| RAM ADDRESS | CONTENT | VALUE | COMMENT |
|---|---|---|---|
| (1, 1) | 1001 | 9/100 SEC | DIGIT FOR 1/100 SEC |
| (1, 2) | 0101 | 5/10 SEC | DIGIT FOR 1/10 SEC |
| (1, 3) | 0100 | 4 SEC | DIGIT FOR 1 SEC |
| (1, 4) | 0101 | 50 SEC | DIGIT FOR 10 SEC |
| (1, 5) | 1000 | 8 MINUTES | DIGIT FOR 1 MINUTE |
| (1, 6) | 0011 | 30 MINUTES | DIGIT FOR 10 MINUTES |
| (1, 7) | 0111 | 7 HOURS | DIGIT FOR 1 HOUR |
| (1, 8) | 0010 | 20 HOURS | DIGIT FOR 10 HOURS |
| ⋮ | ⋮ | ⋮ | ⋮ |

MULTI-FUNCTION ELECTRONIC DIGITAL WATCH

BACKGROUND OF THE INVENTION

1. Field of the Invention

This invention relates to a multi-function electronic digital watch of the dynamic logic type wherein timekeeping, displaying etc. are performed by sequentially reading out a series of control instructions written in a read only memory (ROM), in accordance with predetermined timing pulses.

2. Description of the Prior Art

In recent years it has now become popular for electronic digital watch to have not only a time indicating function, but also a stop watch function, a timer function, a calender function etc. In cases of intending to realize such multiple functions with static logic, independent logic circuits need to be disposed for the respective functions. This has led to the problems in that a scale of a circuit arrangement as the whole becomes large and that the fabrication of the circuit arrangement in the form of a monolithic IC is difficult. In order to solve this problem, there has been adopted the so-called dynamic logic system wherein a series of control instructions written in a ROM are sequentially read out according to predetermined timing pulses (for example, clock pulses on the order of 4 KHz) defining machine cycles, and predetermined information processings are completed according to the control instructions and within a fixed time interval (for example, 1/10 sec) to provide the time base of the watch, whereby timekeeping, displaying etc. are executed.

With such systems, however, in adding the stop watch function which can measure down to, for example, the digit for 1/100 sec, the time base of the watch needs to be made 1/100 sec. Therefore, the predetermined information processings performed when the time base has been 1/10 sec and also information processings increased by the addition of the stop watch function must be completed within 1/100 sec. In order to cope with this situation, the frequency of the timing pulses needs to be made high. The high frequency is attended with increases in the charging and discharging currents of capacitance elements, stray capacitances etc. of the circuitry, and results in various problems such as an increase in the power dissipation and a lowering in the speed margin in a low-voltage operation.

Besides, since the frequency of an oscillator circuit for a watch is a comparatively low frequency of, for example, 32,768 Hz, it is subject to limitations in making the frequency of the timing pulses high as described above. In order to complete all of the necessary processings within 1/100 sec as stated above, a high frequency oscillator circuit is required. This means that the whole circuit arrangement becomes a high frequency circuit, resulting in problems such as complication of the circuit arrangement and increase in the power dissipation of the oscillator circuit.

SUMMARY OF THE INVENTION

An object of this invention is to provide a multi-function digital watch which realizes timekeeping in a very short time unit, for example, in the digit of 1/100 sec while avoiding a complicated circuit arrangements and achieving a low power dissipation for the whole circuit.

In order to accomplish the object, according to this invention, timekeeping in a time unit shorter than the time base of a watch is realized without shortening the time base. To this end there is provided a digital watch which comprises count means to receive a timing signal shorter in period than a time base signal, indication input means, temporary holding means to load an output of the count means upon an indication of the input means, and means to correct a time signal stored in a memory on the basis of an output of the holding means and to deliver the corrected time signal.

DETAILED DESCRIPTION OF THE PREFERRED EMBODIMENTS

Figure 1:
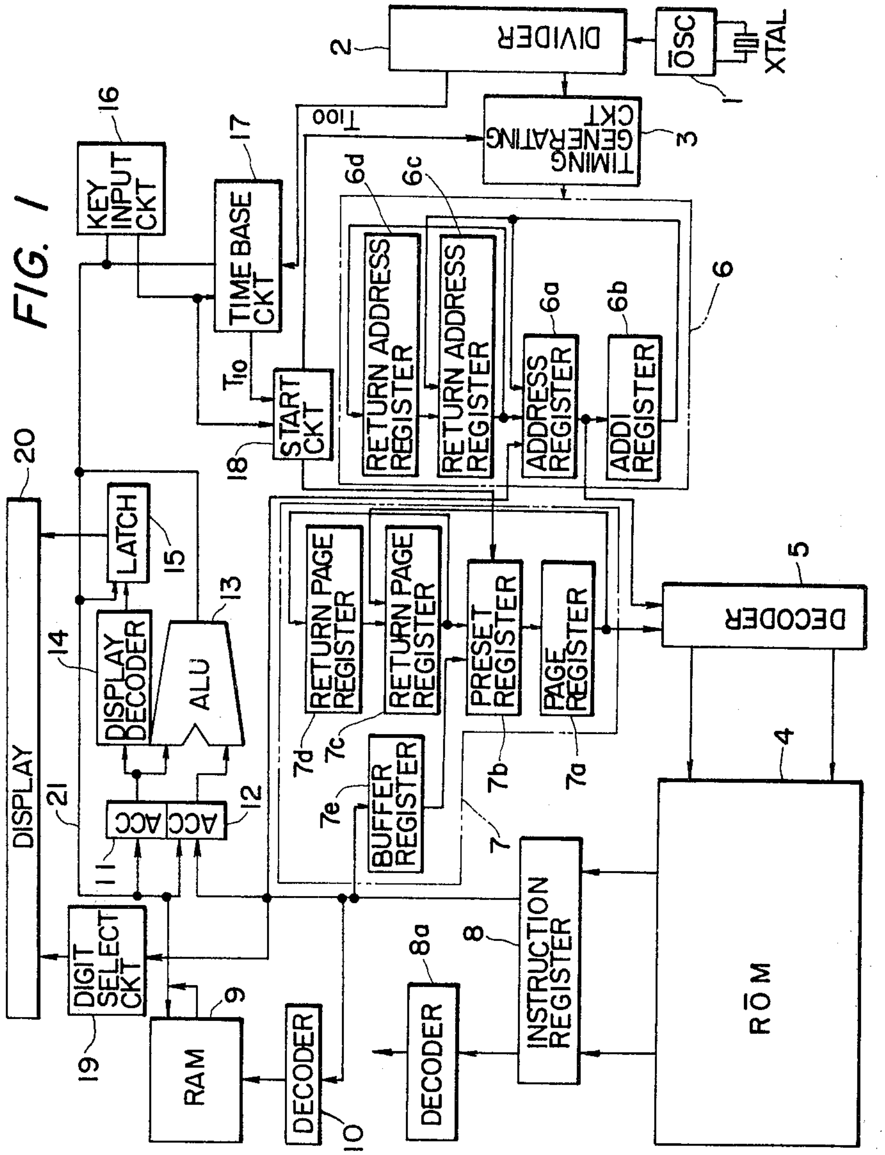
FIG. 1 is a circuit block diagram showing an embodiment of a digital watch according to this invention, FIG. 2(*a*) is a diagram for exemplifying control instructions stored in a ROM, while FIG. 2(*b*) is a diagram for explaining timekeeping which uses some addresses of a RAM.

FIG. 1 is a block diagram showing a digital watch embodying this invention. Referring to the figure, numeral 1 designates a crystal oscillator which generates a reference frequency signal of 32,768 Hz, numeral 2 a frequency divider which generates a frequency division output of the reference frequency signal, numeral 3 a timing generating circuit which receives the output signal of the frequency divider 2 and which generates control pulses necessary for dynamic logic operations and supplies them to various circuits, and numeral 4 a ROM in which a series of control instructions necessary for timekeeping, displaying etc. are stored.

The ROM 4 has a memory capacity of, for example, 2,048 words. One control instruction is allotted to one word, and control instructions totaling 2,048 ($=128\times16=2^7\times2^4$) are stored over 16 pages each including 128 control instructions. Upon an output of a decoder 5, each control instruction is read out from the corresponding address into an instruction register 8. In the decoder 5, a page information of 4 bits stored in a page register 7*a* is decoded so as to select one of the 16 pages. Further, an address information of 7 bits stored in an address register 6*a* is decoded so as to select one of the 128 ($=2^7$) words included in the selected page.

An address appointment portion 6 is constructed of the address register 6*a*, a register 6*b* which adds "1" to the content of the register 6*a*, and registers 6*c* and 6*d* which store return addresses at the time when subroutine jumps are made due to interrupt etc.

A page appointment portion 7 is constructed of the page register 7*a*, a preset register 7*b* which stores a specified value to be given to the page register 7*a*, registers 7*c* and 7*d* which store return pages at the subroutine jumps, and a buffer register 7*e* which temporarily stores the address of the ROM 4 loaded in the instruction register 8.

The instruction register 8 sets the control instruction read out from the ROM 4. The information of an instruction part in the control instruction is decoded in a decoder 8*a*, and becomes a control signal for executing a predetermined information processing to be performed within one time base. The information of an address part becomes an address of a random access memory (RAM) 9, and it is set in the address register 6a and the buffer register 7e to become the jump destination address of the ROM 4, etc. It is also possible to employ the information of the address part as a control signal or a literal value on the basis of appointment by the information of the instruction part. Time information such as dates, days of the week, and hours, minutes and seconds; information on times to be measured by the stop watch function; information on set times for the timer function; alarm information; etc. can be set in the RAM 9 at will. It is possible to read out data from the RAM 9 in accordance with the control instruction of the ROM 4 so as to perform an arithmetic processing or a displaying processing, and also to write the result of the arithmetic processing into the RAM 9.

Hereunder, the timekeeping by the RAM 9 will be described with reference to FIGS. 2(*a*) and 2(*b*). It is assumed that control instructions indicated in FIG. 2(*a*) are successively written from page 1, address 0 of the ROM 4. As they are sequentially read out and executed, a time in 1/10 second, a time in 1 second, . . . are sequentially counted in locations (1, 2), (1, 3), . . . of the RAM 9 as indicated in FIG. 2(*b*).

This will now be described in further detail.

(i) By executing an instruction—Load 1, 2—read out from page 1, address 0 of the ROM 4, a value (1, 2) for appointing the location (1, 2) of the RAM 9 is applied to a decoder 10.

(ii) By executing an instruction—Binary Add 1—read out from page 1, address 1 of the ROM 4, the content of the location (1, 2) of the RAM 9 is read out and is set in an accumulator 11 for operand 1 (hereinbelow, abbreviated to "ACC 11"), while a value 1 read out from the instruction register 8 is set in an accumulator 12 for operand 2 (hereinbelow, abbreviated to "ACC 12"). The contents of the ACC 11 and the ACC 12 are added in an arithmetic logic unit 13 (hereinbelow, abbreviated to "ALU 13"), and the result is stored in the location (1, 2) of the RAM 9 through a bus line 21 of 4 bits.

(iii) By executing an instruction—Less Than 10—read out from page 1, address 2 of the ROM 4, the subtraction between the content A of the location (1, 2) of the RAM 9 and a value 10 from the instruction register 8 is performed in the ALU 13, and the borrow bit of the result is checked:

If borrow=1 ($A-10<0$), the operation proceeds to (iv).

If borrow=0 ($A-10\geqq 0$), the operation proceeds to (v).

(iv) By executing an instruction—Branch 20—read from page 1, address 3 of the ROM 4, the operation branches to page 1, address 20 of the ROM 4 and an instruction—Halt—stored therein is executed. Thereafter, unless interrupt or the like occurs, the state of "halt" is held until the next period of 1/10 sec begins.

(v) By executing an instruction—Transfer 0—read out from page 1, address 4 of the ROM 4, a value 0 from the instruction register 8 is set in the location (1, 2) of the RAM 9 through the ALU 13. (As a result, the location (1, 2) of the RAM 9 is cleared.

(vi) By executing an instruction—Load 1, 3—read out from page 1, address 5 of the ROM 4, a value (1, 3) for appointing the location (1, 3) of the RAM 9 is applied to the decoder 10.

(vii) Likewise to (ii), "1" is added to the location (1, 3) of the RAM 9. (This corresponds to the fact that a carry has occurred in a counter for the digit of 1/10 sec executed in the location (1, 2) of the RAM 9 as indicated in FIG. 2(*b*), the timekeeping of the digit of 1 sec having been performed.) Thereafter, the timekeeping of the digit of 10 sec is performed in location (1, 4) of the RAM 9. Similarly, the timekeeping of the digit of 1 minute is performed in location (1, 5) of the RAM 9, that of the digit of 10 minutes in location (1, 6), etc.

That is, since the present register 7b is set to page 1, address 0 at intervals of 1/10 sec, the timekeeping in 1/10 sec is permitted by executing the flow described above. The instruction in each step of the flow is executed within 1 machine cycle (for example, 250 μs). 'Content' and 'Value' in FIG. 2(*b*) indicate an example of the content in the course of the timekeeping in each address of the RAM 9 and an example of the corresponding time.

Figure 3:
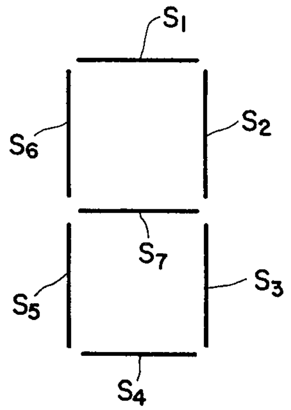
FIG. 3 is a diagram showing the arrangement of segments for indicating numerals in a watch, and FIG. 4(*a*) is a circuit diagram showing the arrangement of an example of a time base circuit in FIG. 1, while FIG. 4(*b*) is a diagram showing signal waveforms in principal portions in FIG. 4(*a*).

In order to display a time formed in the RAM 9, the contents of the addresses of the RAM 9 corresponding to the respective digits of the time are read out by control instructions, and they are decoded by a display decoder 14 through the ACC 11 and then latched in a latch circuit 15. An output of the latch circuit 15 is applied to a display 20, and becomes an appointment for appointing segments corresponding to a numeral to-be-displayed among numeral segments $S_1$–$S_7$ which are illustrated in FIG. 3 by way of example.

On the other hand, when appointing the digit to be displayed, a digit appointment instruction is read out from the ROM 4, and a signal obtained by decoding the instruction is applied as a digit appointment signal to the display 20 through a digit select circuit 19.

The display 20 is driven by the segment appointment signal and the digit appointment signal, and the segments corresponding to the appointed digit are driven. The timer function, for example, may be realized in such a way that a time to be externally set is stored in a location of the RAM 9 by means of a key input circuit 16 etc., that the content of the location is counted down in units of 1/10 sec, 1 sec etc. from the least significant digit, and that when the content has become "0", a drive signal for, e.g., an alarm device (not shown) is generated.

The above operation has heretofore been performed. In this case, only the timekeeping in 1/10 sec is possible, and the timekeeping in a unit of a still shorter time is difficult.

This invention makes possible the timekeeping, the displaying etc. in a unit of a very short time, for example, 1/100 sec.

By taking as examples the timekeeping and the displaying in 1/100 sec in the stop watch function, this invention will now be described with the center on the operations of a time base circuit 17 and its peripheral circuitry.

Figure 4A:
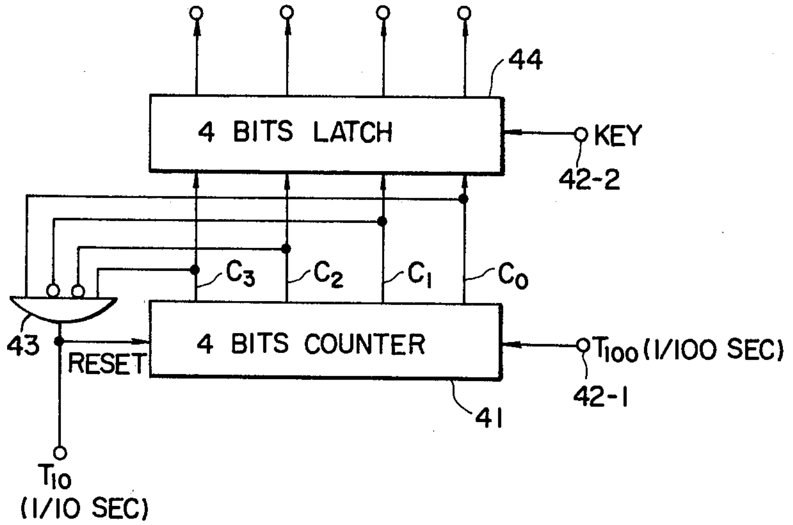
Figure 4B:
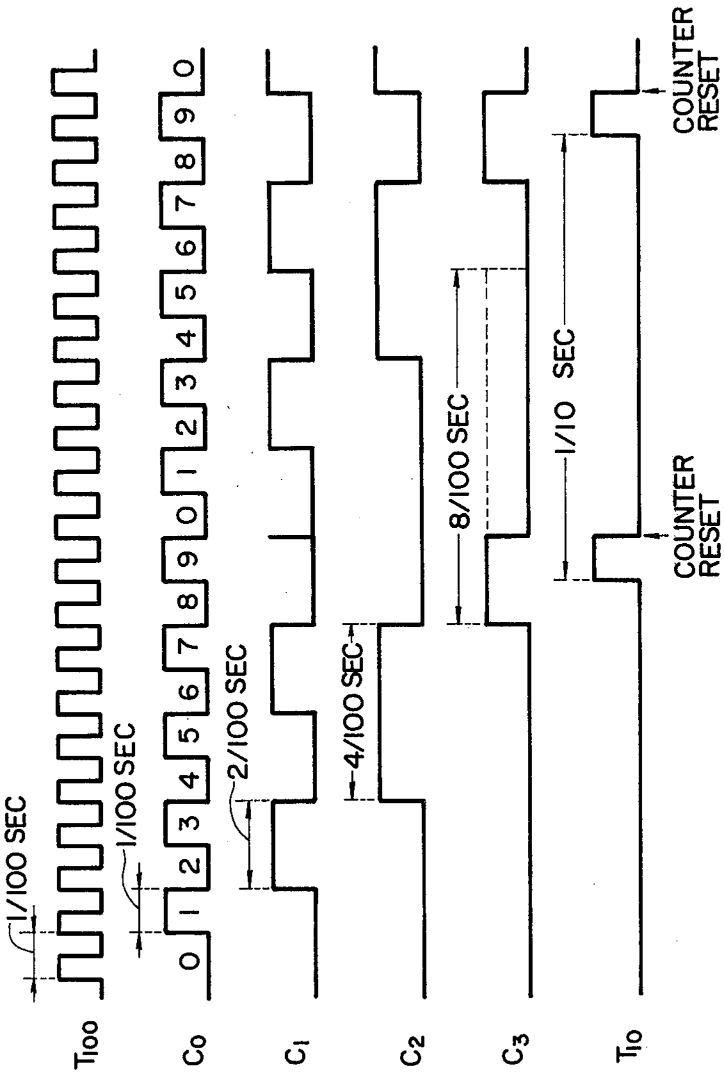

As shown in FIG. 4(*a*), the time base circuit 17 is made up of a decimal counter of 4 bits 41 which is caused to run freely by pulses having a period of 1/100 sec, an AND gate 43 which produces a decimal output from the contents of the respective bits of the counter 41, and a latch circuit of 4 bits 44 which latches the contents of the counter. A time at the digit of 1/100 sec is stored in address 1, for example, of the RAM 9.

Timing pulses having a period of 1/100 sec (hereinbelow, called "$T_{100}$") formed by the frequency divider 2 are applied to a clock terminal 42-1 of the counter 41 of the time base circuit 17. Timing pulses having a period of 1/10 sec (hereinbelow, called "$T_{10}$") are produced from outputs of the respective bits of the counter 41 by means of the AND gate 43, and they are applied to a start circuit 18. In addition, a key signal such as a start or stop signal generated in the key input circuit 16 is applied to the start circuit 18.

The start circuit 18 is a circuit according to which, when the start or stop signal has been receivied upon depression of a start or stop key, a signal is fed to the preset register 7b in synchronism with the timing $T_{10}$ so as to set a predetermined value therein, and simultaneously, a starting pulse synchronized with the timing $T_{10}$ is transmitted to the timing generating circuit 3. This start circuit can be easily realized by combining conventional logic circuits.

When the start key of the stop watch has been depressed, the start signal generated by the key input circuit 16 is applied to a key input terminal 42-2 in the time base circuit 17, and the content of the counter 41 is latched in the latch circuit 44. At the same time, the start signal is applied to the start circuit 18. In order to jump to that page in the ROM 4 in which is stored the first control instruction among a series of control instructions necessary for realizing the stop watch function, the output of the start circuit 18 based on the start signal becomes an interrupt signal for setting the jump destination page in the preset register 7b. In accordance with control pulses generated by the timing generating circuit 3, desired control instructions are read out from the corresponding pages of the ROM 4 on the basis of the pages set in the preset register 7b and are sequentially executed.

Specifically, the processing is performed so that the content of the latch circuit 44 of the time base circuit 17 immediately after the start signal has turned "on" is stored in a predetermined address of the RAM 9 (location (1, 1) in the example of FIG. 2(*b*)) through the bus line of 4 bits 21. Thereafter, lapsed times are stored in predetermined addresses of the RAM 9 (location (1, 2) and succeeding locations in the example of FIG. 2(*b*)) in unit of 1/10 sec.

While performing the above timekeeping, and by occupying several machine cycles within the 1/10 sec interval, the displaying is performed in such a way that the contents of addresses corresponding to the respective digits are read out from the RAM 9, that they are decoded by the display decoder 14 and that the decoded results are latched in the latch circuit 15 so as to appoint segments of a numeral to-be-displayed. Also, a digit appointment instruction is read out from the ROM 4 and is executed so as to appoint a digit, signals of the appointments being delivered to the display 20. During the timekeeping of the stop watch, even when the digit of 1/100 sec is displayed the display is difficult to discern visually. Hence, the digit of 1/100 sec may be displayed, for example, as numeral "8" by selecting all the display segments $S_1$–$S_7$.

When the stop key has been subsequently depressed, the content of the counter 41 in the time base circuit 17 is latched in the latch circuit 44 by the stop signal generated in the key input circuit 16. At the same time, the stop signal is applied to the start circuit 18 in the same manner as the start signal described above. The output of the start circuit 18 based on the stop signal becomes an interrupt signal for setting a jump destination page in the preset register *b*. Using this page, the operation is caused to jump to that page of the ROM 4 in which is stored the first control instruction among a series of control instructions necessary for correcting a time in the RAM 9 at the stop of the stop watch down to the digit of 1/100 sec and then displaying the corrected time.

In accordance with control pulses generated by the timing generating circuit 3, desired control instructions are read out from the corresponding pages of the ROM 4 on the basis of the pages set in the preset register 7b and are sequentially executed.

In particular, the content of the latch circuit 44 of the time base circuit 17 immediately after the stop signal has turned "on" is stored in a previously appointed address of the RAM 9 through the bus line of 4 bits 21.

Subsequently, the time of the digit of 1/100 sec at the stop as stored in the RAM 9 and the time of the digit of 1/100 sec at the start as stored in the location (1, 0) of the RAM 9 are read out, and the difference between the times is calculated in the ALU 13, whereby the correction for the digit of 1/100 sec is made. The time of the digit of 1/100 sec after the correction is decoded by the display decoder 14, the decoder output is latched in the latch circuit 15 and becomes a display segment appointment signal, and at the same time as the execution of a digit appointment instruction, the exact time of the digit of 1/100 sec is displayed. Thereafter the time of the digit of 1/10 sec, the time of the digit of 1 sec, the time of the digit of 10 sec, . . . etc. are sequentially displayed, and an exact stop watch function is realized in a unit of 1/100 sec.

Assuming by way of example that the content of the counter 41 at the start is (1000), i.e., 0.08 second and that the measured time at the stop as includes the digit of 1/100 sec is '11 minutes 25.03 seconds', the ALU 13 executes the operation:

11 minutes 25.03 seconds − 0.08 second = 11 minutes 24.95 seconds and an exact timekeeping is performed in a unit of 1/100 sec.

It is also possible to perform the lap operation of the stop watch in a unit of 1/100 sec.

Assuming by way of example that the content of the counter 41 of the time base circuit 17 at the start is B=(0101), i.e., 0.05 sec and that the measured times at the first, second . . . laps are A $A_1$=1 minute 15.06 seconds, $A_2$=11 minutes 25.03 seconds, . . . in succession, the content B has the minus sign (−) assigned and is added to the times $A_1$, $A_2$, . . . in the ALU 13 as follows:

$A_1$+(−B)=1 mainute 15.01 seconds $A_2$+(−B)=11 minutes 24.98 seconds

In this way, correct lap times are obtained in a unit of 1/100 sec.

Since the lap operation can be executed by the interrupt processing as in the foregoing cases of start and stop, it is easily realizable merely by adding a subroutine for the lap operation to the ROM 4.

Further, two or more stop watch functions can be realized merely by adding subroutines to the ROM 4 and adding new addresses for storing times to the RAM 9.

As described above in detail, according to this invention, while the time base remains long, for example, at 1/10 sec, the timekeeping at the digit of 1/100 sec and the displaying of the result can be performed.

Various timing pulses necessary for executing instructions may be signals of comparatively low frequencies. As a result, charging and discharging currents for stray capacitances etc. can be reduced to achieve a reduction of the power dissipation, and a high frequency oscillator circuit can be dispensed with to achieve simplification of the whole circuit. The invention thus, has a number of significant practical advantage.

What is claimed is:

1. A digital watch of the dynamic logic type comprising:

first memory means in which a series of control instructions are written;

arithmetic means coupled to an output of said first memory means to receive control instructions from said first memory and to execute predetermined operations in accordance with said control instructions;

second memory means coupled to said arithmetic means and a timing means, said second memory means storing time signals of a plurality of digits therein; control means coupled to said first and second memory means and to said timing means for sequentially reading out the control instructions of the first memory means and for renewing a time signal of a less significant digit stored in the second memory means each time a predetermined time base signal has been received from said timing means in accordance with a read control instruction and for also renewing a time signal of a more significant digit stored in the second memory means when a carry signal has generated in the renewed time signal of the less significant digit;

count means in said timing means coupled to receive a timing signal shorter in period than the time base signal;

indication input means;

temporary holding means coupled to said count means, said indication input means, and said second memory means to load an output of said count means upon an indication of said input means and to pass this loaded output to said second memory means for storage; and output means coupled to the second memory means and said arithmetic means to deliver an output signal including a time signal of a least significant digit determined by the period of said timing signal shorter in period then the time base signal, on the basis of an output of said holding means and the time signals stored in said second memory means.

2. A digital watch according to claim 1, further comprising means to generate said time base signal on the basis of said output of said count means.

3. A digital watch according to claim 1 or 2, wherein said output means comprises display means to display said output signal including the time signal of the least significant digit.

4. A digital watch according to any of claims 1 or 2, wherein said first and second memory means are respectively constructed of a ROM and a RAM.

5. A digital watch according to any of claims 1 or 2, wherein said arithmetic means comprises first and second registers which accumulate input information, and an arithmetic circuit which executes an addition and a subtraction of outputs of said registers.

* * * * *